(12) United States Patent
Fontana et al.

(10) Patent No.: US 6,643,122 B1
(45) Date of Patent: Nov. 4, 2003

(54) BATTERY SERVICING SYSTEM WITH BRIDGING PROTECTION

(75) Inventors: Edward C. Fontana, Rockwall, TX (US); Vincent M. Byrne, Mesquite, TX (US); Michael R. Buskmiller, Dallas, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 0 days.

(21) Appl. No.: 10/293,835

(22) Filed: Nov. 13, 2002

(51) Int. Cl.[7] .................................................. H02B 1/00
(52) U.S. Cl. ........................ 361/601; 361/615; 361/617; 361/732; 429/97; 312/223.1
(58) Field of Search ................................. 361/600, 601, 361/615, 616, 617, 627, 641, 644, 732; 211/186; 429/96, 97, 99; 248/694; 312/223.1, 223.2

(56) References Cited

U.S. PATENT DOCUMENTS

| | | | | | |
|---|---|---|---|---|---|
| 4,678,215 A | * | 7/1987 | Rehbein et al. | ............. | 292/247 |
| 5,140,744 A | * | 8/1992 | Miller | ......................... | 29/730 |
| 5,327,321 A | * | 7/1994 | Rosen | ......................... | 361/617 |
| 5,751,543 A | * | 5/1998 | Gehrs et al. | ................ | 361/641 |
| 5,890,606 A | * | 4/1999 | Kuipers | ...................... | 211/186 |
| 5,981,101 A | * | 11/1999 | Stone | ......................... | 429/100 |
| 6,452,810 B1 | * | 9/2002 | Wilcox | ....................... | 361/796 |

* cited by examiner

Primary Examiner—Boris Chérvinsky (57) ABSTRACT

For use with a rack for supporting a first battery having first terminals and a second battery having second terminals, an interlock kit comprising a partition mount and a partition. The partition mount is couplable to the rack proximate the first battery and the second battery. The partition is coupled to the partition mount and translatable between a first battery access position that allows access to ends of the first terminals and obstructs access to the second terminals and a second battery access position that allows access to ends of the second terminals and obstructs access to the first terminals.

20 Claims, 5 Drawing Sheets

BATTERY SERVICING SYSTEM WITH BRIDGING PROTECTION

TECHNICAL FIELD OF THE INVENTION

The present invention is directed, in general, to energy storage and, more specifically, to an interlock kit obstructing concurrent access to terminal ends of more than one battery.

BACKGROUND OF THE INVENTION

Lead-acid batteries have long been in use for a wide variety of applications. For example, lead-acid batteries have been used for what have sometimes been termed "stationary" battery applications wherein the batteries provide stand-by power in the event of a power failure. In such applications, the batteries are maintained at full charge in a ready-to-use condition, such as by float maintenance charging at a preset voltage. Some lead-acid batteries, such as valve-regulated lead acid batteries typically utilized in outdoor telecommunications cabinet applications, may have an operational life ("float" life) of 10–15 years.

The next three paragraphs should talk about (1) bridging problems (2) not disconnecting before accessing and (3) battery density.

The high energy content present in batteries used in backup energy reserve power systems presents safety hazards during battery installation, maintenance and use. Significant volume within prior art power systems is often consumed to provide tool access to battery terminals in order to minimize the risk of bridging or shorting between battery terminals or from the terminals to the cabinet enclosure.

In addition, prior art systems do not restrict access to battery terminals when the battery or battery string is connected to an external load or other battery strings in some advantageous battery orientations. Accordingly, service personnel may inadvertently attempt to service a battery in prior art systems while the battery is connected to the external load or other battery strings, posing serious safety hazards. Attempts to rectify this problem have included terminal covers that must be removed to access the battery terminals, but the covers were often not replaced, and they were easily damaged and/or misplaced.

Moreover, the cabinet space allotted for the batteries and access thereto is limited. For example, a common industry standard for such battery cabinets stipulates a cabinet width limited to only 600 mm. However, a significant portion of the space available inside the cabinet is required for access envelopes instead of battery storage. Accordingly, the maximum number of batteries that may be installed into a standard cabinet ("battery density") is limited by the need to access the batteries once installed in the cabinet. Some battery cabinets of the prior art attempted to cure this deficiency and increase battery density by utilizing shelves configured to slide out and provide access to the more closely arranged batteries. However, such shelves only modestly reduced the clearance required for safe access by tools and/or human appendages, and were accompanied by an increased cost of the entire rack structure.

Accordingly, what is needed in the art is a battery storage and servicing system that does not suffer from the deficiencies found in the prior art.

SUMMARY OF THE INVENTION

To address the above-discussed deficiencies of the prior art, the present invention provides an interlock kit for use with a rack for supporting a first battery having first terminals and a second battery having second terminals. In one embodiment, the interlock kit comprises a partition mount and a partition coupled thereto. The partition mount is couplable to the rack proximate the first battery and the second battery. The partition is translatable between a first battery access position that allows access to ends of the first terminals and obstructs access to the second terminals and a second battery access position that allows access to ends of the second terminals and obstructs access to the first terminals.

The present invention therefore introduces the concept of substantially eliminating the shock hazard conventionally encountered with battery storage configurations having high packing density by at least obstructing access to the terminals of multiple batteries. As discussed below, the present invention also introduces the concept of isolating the batteries from other battery strings and/or an external load before access thereto is allowed, as discussed below. Accordingly, conventional floating-charged batteries may be stored and maintained in high-packing-density configurations without the risk of inadvertently bridging or shorting across the terminals of adjacent batteries.

In one embodiment of the present invention, the interlock kit further comprises an actuator mount and actuator. The actuator mount is couplable to the rack proximate the first battery and the second battery. The partition mount may also be the actuator mount. The actuator is coupled to the actuator mount and translatable between an online position that obstructs translation of the partition and in which the first and second batteries are connected to an external load and an offline position that allows translation of the partition and in which the first and second batteries are disconnected from the external load. In one embodiment, the actuator may engage a disconnect switch to connect and disconnect the first and second batteries to and from the external load. The actuator may also obstruct access to one of the first and second terminal ends when in the online position. Accordingly, the present invention may permit access to a battery in a string of batteries only after the string is disconnected from the external load, thereby preventing inadvertent current from any source other than the string comprising the specific battery being accessed.

In an embodiment to be illustrated and described, the first terminal ends may face the second terminal ends and the partition may interpose the first and second terminals. In this manner, the volume required to access the first terminal ends may at least partially overlap the volume required to access the second terminal ends. Accordingly, a smaller percentage of the battery cabinet volume may be required for first and second terminal end access space.

In one embodiment of the present invention, the interlock kit is for use with a rack that also supports a third battery having third terminals and a fourth battery having fourth terminals. In such an embodiment, the first battery access position may allow access to ends of the third terminals and obstruct access to the fourth terminals, and the second battery access position may allow access to ends of the fourth terminals and obstruct access to the third terminals. In one embodiment, the online position causes all four of the batteries to be connected to the external load and the offline position causes all four of the batteries to be disconnected from the external load.

Of course, those skilled in the art will recognize that the scope of the present invention includes racks that support more than four batteries. In such embodiments, one or two batteries of a battery string may be accessed in the first battery access position such that remaining batteries may not be accessed, the online position may cause one or more batteries in the battery string to be connected to the external load, and the offline position may cause one or more batteries in the battery string to be disconnected from the external load.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
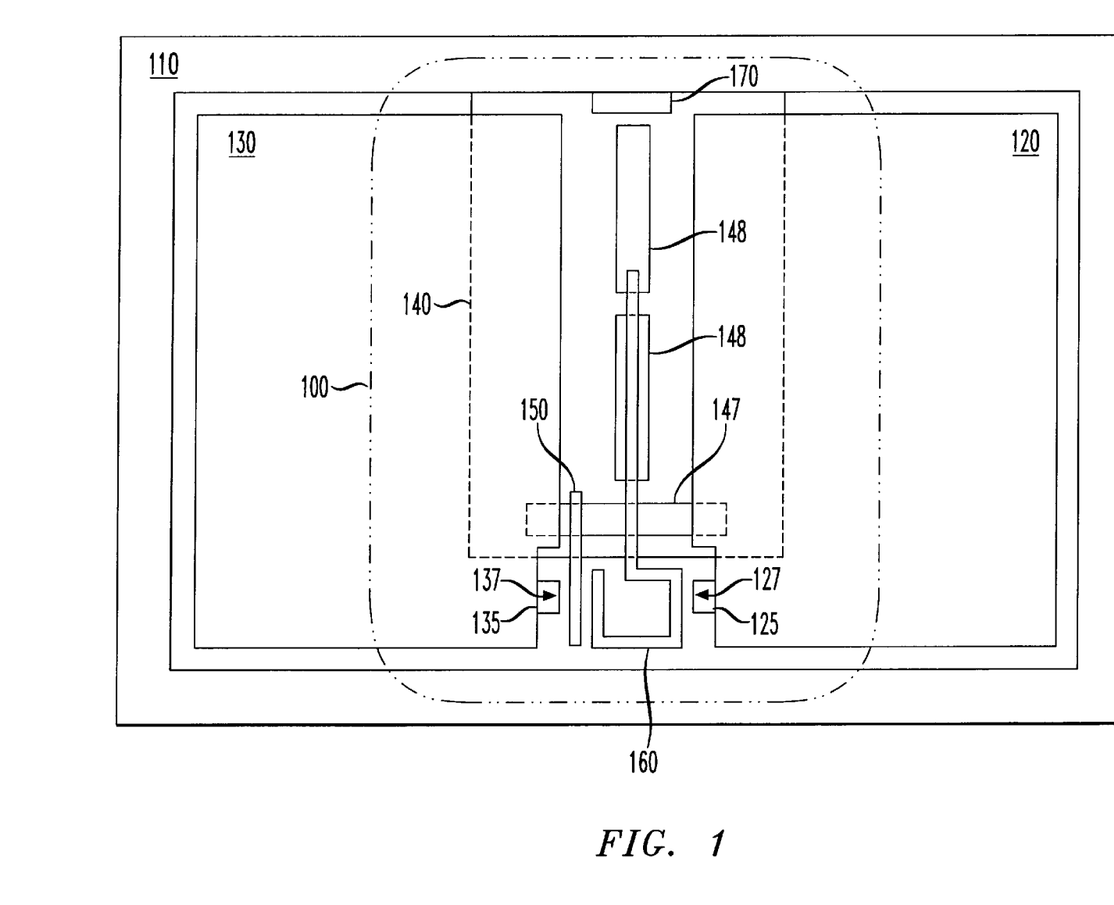
FIG. 1 illustrates a top view of one embodiment of an interlock kit constructed according to the principles of the present invention.

Referring initially to FIG. 1, illustrated is a top view of one embodiment of an interlock kit 100 constructed according to the principles of the present invention. The interlock kit 100 may be for use with a rack 110 that supports a first battery 120 having first terminals 125 and a second battery 130 having second terminals 135. The rack 110 may comprise at least a portion of a conventional battery cabinet.

The interlock kit 100 may contain a partition mount 140 couplable to the rack 110 proximate the first battery 120 and the second battery 130. The partition mount 140 may be couplable to the rack 110 by conventional means, such as threaded fasteners or a tab/slot configuration, or may be an integrally formed element of the rack 110. Moreover, the use of the term "coupled" or "couplable" above and hereafter is intended to include both direct and indirect coupling. For example, the partition mount 140 may be directly coupled to the rack 110 as depicted in FIG. 1, or the partition mount 140 may be indirectly coupled to the rack 110, such as through an intervening feature (not shown). The partition mount 140 may comprise any substantially rigid material, including without limitation steel, aluminum, plastic, fiberglass or compounds thereof. In one embodiment, the partition mount 140 may be formed by injection molding or by stamping a pattern in a sheet of the desired material.

The interlock kit 100 may also include a partition 150 coupled to the partition mount 140. The partition 150 may comprise any electrically insulative material, including without limitation plastic, fiberglass or compounds thereof. In one embodiment, the partition 150 may be formed by injection molding or by stamping a pattern in a sheet of the desired material. In an advantageous embodiment, the partition 150 may be formed simultaneously with the partition mount 140.

The partition 150 is coupled to the partition mount 140 such that the partition 150 interposes the first and second terminals 125, 135 and may translate along a portion of the partition mount 140. While those skilled in the art understand that numerous means may be employed to couple the partition 150 to the partition mount 140 in such a slidable manner, an exemplary configuration is shown in FIG. 2.

Figure 2:
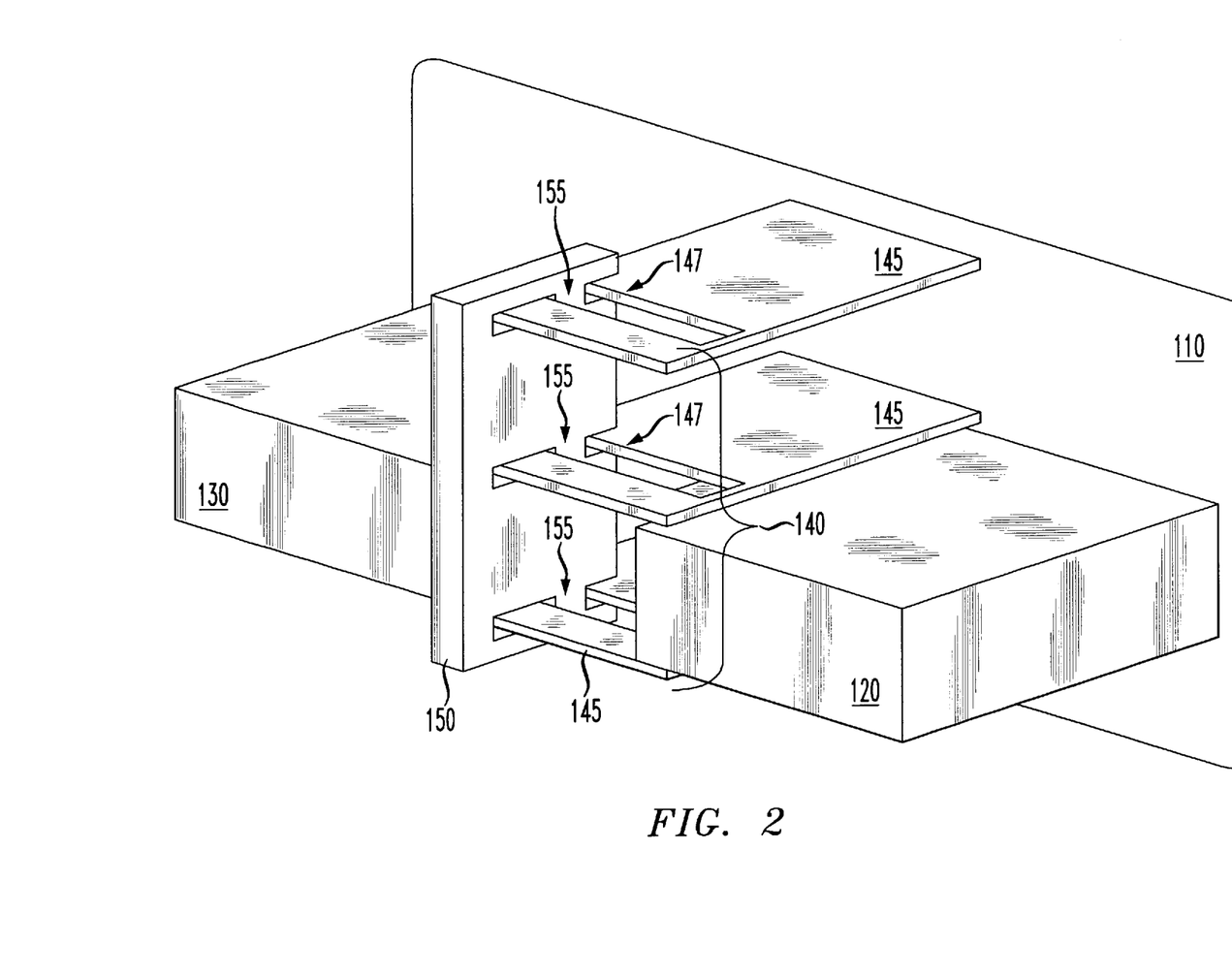
FIG. 2 illustrates a side view of one embodiment of a portion of the interlock kit shown in FIG. 1.

Turning briefly to FIG. 2, illustrated is a side view of an embodiment of the partition mount 140 and partition 150 shown in FIG. 1. As shown in FIG. 2, the partition mount 140 may include several rails 145 each having an opening or slot 147 therethrough (also shown in FIG. 1). While FIG. 2 depicts the partition mount 140 as having three rails 145, other embodiments of the partition mount 140 may include more or fewer rails 145, including embodiments having only one rail 145. As also shown in FIG. 2, the partition 150 may include tabs 155 configured to engage with the slots 147 in the rails 145. In this manner, the partition 150 may be slidably coupled to the partition mount 140 such that the partition 150 may translate across the partition mount 140. As mentioned above, the partition 150 may be coupled to the partition mount 140 in other ways enabling such translation within the scope of the present invention. For instance, the partition 150 may include slots configured to engage tabs on the partition mount 140 (not shown).

Returning to FIG. 1, the interlock kit 100 may also include an actuator 160 coupled to an actuator mount. The actuator 160 may comprise any substantially rigid material, including without limitation steel, aluminum, plastic, fiberglass or compounds thereof. In one embodiment, the actuator 160 may be formed by injection molding or by stamping a pattern in a sheet of the desired material. In an advantageous embodiment, the actuator 160 may be formed simultaneously with the partition mount 140 and/or the partition 150.

The actuator mount is couplable to the rack 110 by means that may be at least similar to the means employed to couple the partition mount 140 to the rack 110 discussed above. In one embodiment, the actuator mount may be coupled to or formed integrally with the partition mount 140. In a more specific embodiment shown in FIG. 1, the partition mount 140 may also function as the actuator mount, such that both the partition 150 and the actuator 160 may be coupled thereto. Accordingly, the partition mount 140 will hereafter be referred to merely as the mount 140. Of course, the present invention is not limited to those embodiments in which the partition 150 and the actuator 160 are coupled to the same element.

As shown in FIG. 1, the mount 140 may also include openings 148 configured to engage the actuator 160 in a manner allowing the actuator 160 to translate along the mount 140. In an alternative embodiment, the actuator 160 may include openings (not shown) configured to engage the mount 140 to allow such translation. Accordingly, those skilled in the art will recognize that the actuator 160 may be slidably coupled to the mount 140 by means similar to those employed to slidably couple the partition 160 to the mount 140 as discussed above.

Figure 3:
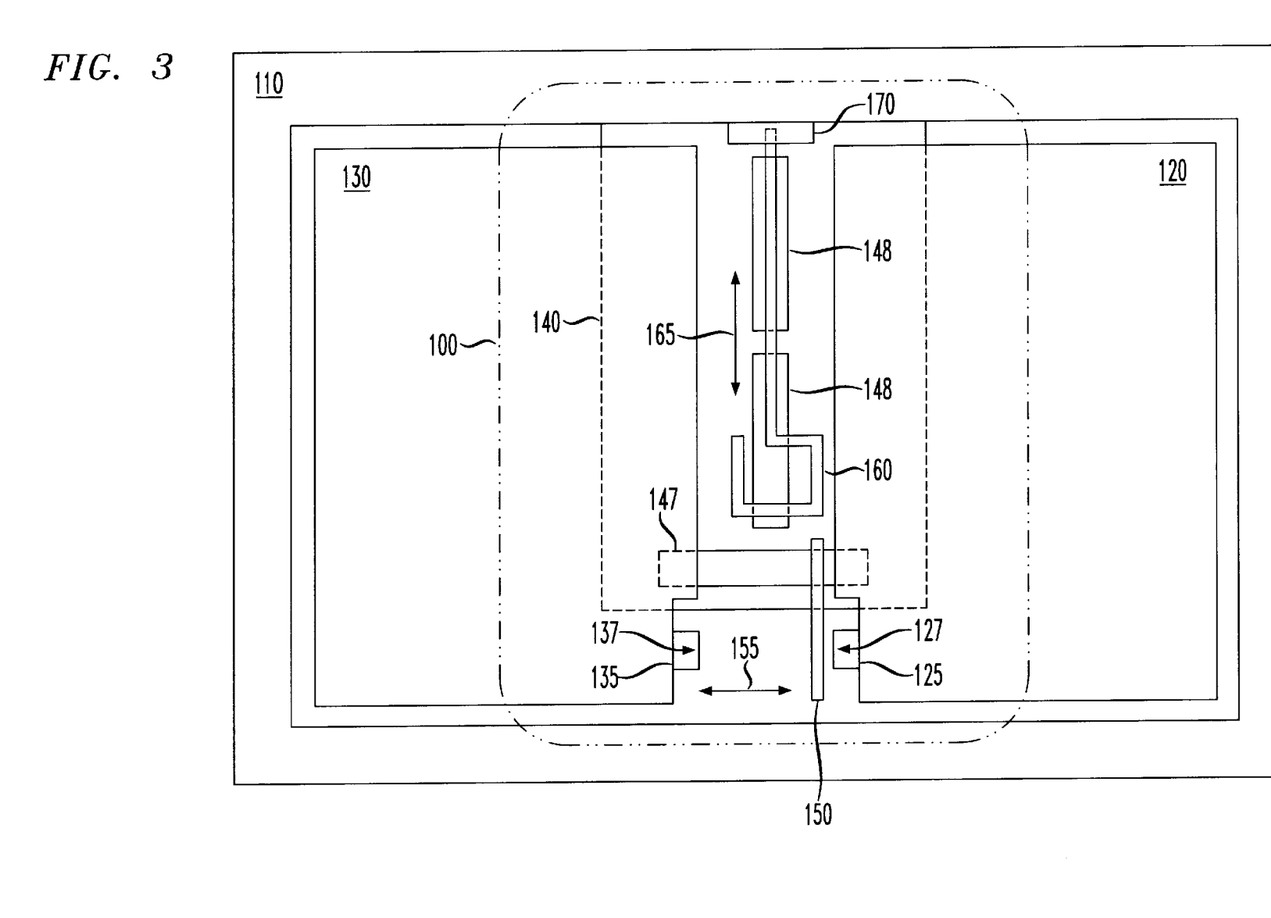
FIG. 3 illustrates another top view of the interlock kit shown in FIG. 1.

Turning to FIG. 3, illustrated is a top view of the interlock kit 100 shown in FIG. 1 after the actuator 160 and the partition 150 have been translated along the mount 140. In one embodiment, the translation of the actuator 160 along the mount 140 may be substantially orthogonal to the translation of the partition 150 along the mount 140. For example, in the particular embodiment shown in FIG. 3, the partition 150 may translate along a direction indicated by the arrow 155 and the actuator 160 may translate along a direction indicated by the arrow 165. However, the present invention is not limited to such orthogonal translation of the partition 150 and the actuator 160. Moreover, in one embodiment the partition 150 and/or the actuator 160 may rotate rather than translate.

As evident from the embodiment shown in FIGS. 1 and 3, the translation of the actuator 160 may be required before the translation of the partition 150. That is, the location of the actuator 160 in a first position shown in FIG. 1 may physically constrain the partition 150 to a first position shown in FIG. 1. Accordingly, the actuator 160 may require translation to a second position as shown in FIG. 3 before the partition 150 may translate to a second position also shown in FIG. 3.

In one embodiment, the first position of the partition 150 shown in FIG. 1 may be a first battery access position that allows access to ends 127 of the first terminals 125 of the first battery 120 and obstructs access to ends 137 of the second terminals 135 of the second battery 130. Similarly, the second position of the partition 150 shown in FIG. 3 may be a second battery access position that allows access to the second terminal ends 137 and obstructs access to the first terminal ends 127. Accordingly, the partition 150 may prevent inadvertently shorting the first and second terminals 125, 135 with a human appendage or a tool (e.g., a wrench) when one of the ends 127, 137 of the terminals 125, 135 are being accessed for maintenance, removal, etc. Moreover, the partition 150 may also prevent bridging across the first and second terminals 125, 135 by providing an insulative barrier therebetween. This is particularly advantageous in those embodiments in which the gap between the first and second terminals 125, 135 may be significantly decreased in order to increase battery density within the rack 110 or other battery enclosure. Accordingly, the present invention allows higher battery densities to be obtained while minimizing the risk of bridging or inadvertent shorting.

In one embodiment, the translation of the actuator 160 between the positions shown in FIGS. 1 and 3 may engage a disconnect switch 170 to connect or disconnect the first battery 120 and the second battery 130 to or from additional battery strings and/or an external load (not shown). For example, the position of the actuator 160 shown in FIG. 1 may be an online position wherein the first and second batteries 120, 130 are connected to additional battery strings or an external load. Similarly, the position of the actuator 160 shown in FIG. 3 may be an offline position wherein the first and second batteries 120, 130 are disconnected from additional battery strings or an external load. An external load may include power sources, electronics and/or additional battery strings housed within or external to the rack 110 (not shown). Accordingly, the actuator 160 may provide convenient means to disconnect a particular battery (120 or 130) prior to access thereof. That is, operational procedures may require a human operator to translate the actuator 160 before accessing the first or second battery 120, 130.

However, in an advantageous embodiment, the online position of the actuator 160 may physically obstruct access to the ends 127, 137 of the terminals 125, 135 when the actuator 160 is in the online position (FIG. 1). In addition, the online position of the actuator 160 may obstruct translation of the partition 150 between the first and second battery access positions, whereas the offline position of the actuator 160 may allow such translation of the partition 150. Accordingly, accessing the terminals 125, 135 of one of the first and second batteries 120, 130 and/or translating the partition 150 to allow such access may physically require the translation of the actuator 160. By requiring the translation of the actuator 160 before physically enabling the translation of the partition 150 and/or allowing access to the terminal ends 127, 137, the terminal ends 127, 137 may only be accessed once the batteries 120, 130 have been disconnected from additional battery strings or an external load. Such a physical requirement to disconnect the batteries 120, 130 before accessing their terminal ends 127, 137 is advantageous over the operational procedure requirement described above because the risk of bridging or inadvertent shorting across the terminal ends 127, 137 or with the rack 110 during servicing is further decreased or even eliminated.

Figure 4:
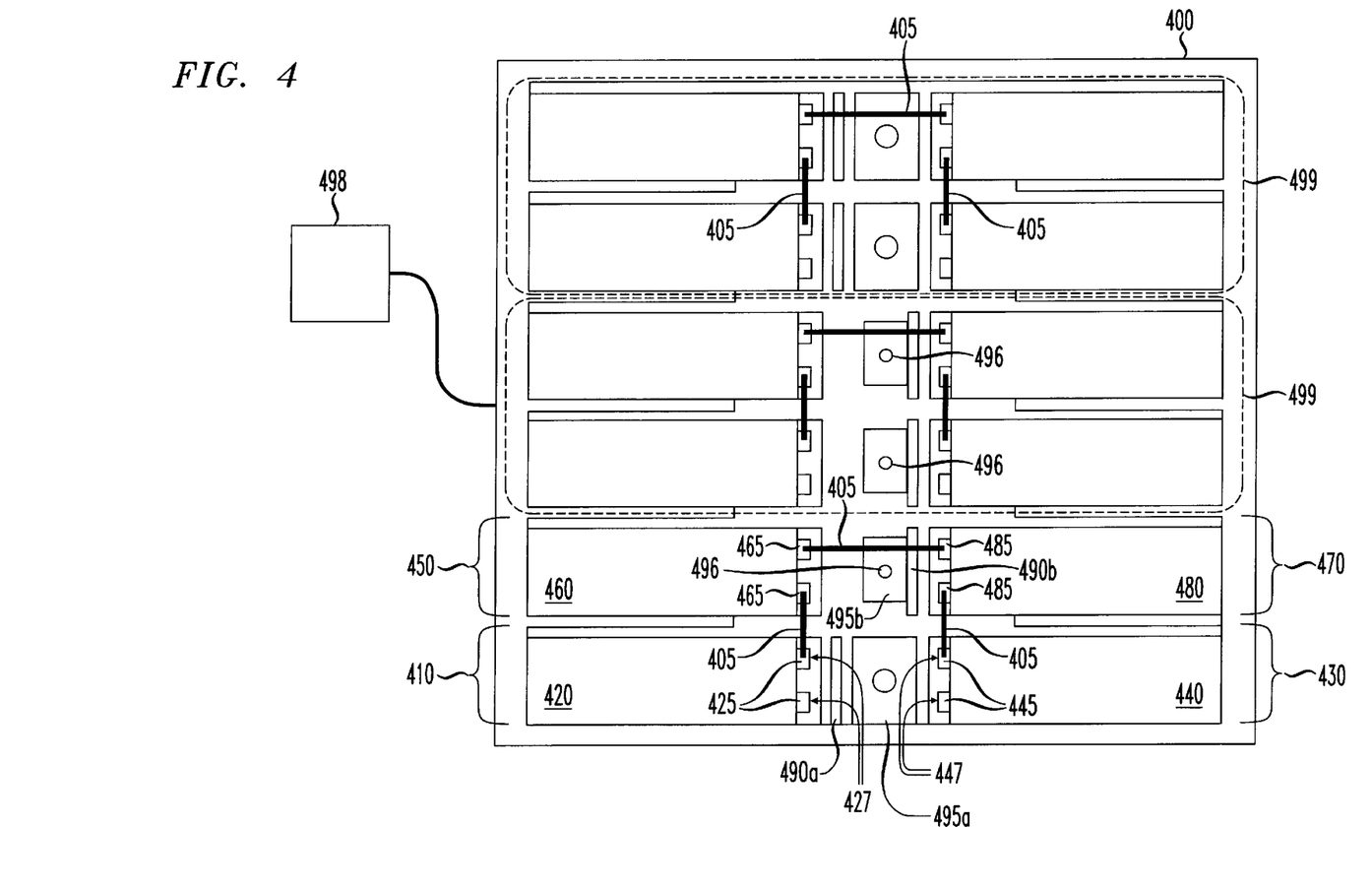
FIG. 4 illustrates a front view of one embodiment of a battery rack constructed according to the principles of the present invention.

Turning to FIG. 4, illustrated is a front view of an embodiment of a battery rack 400 constructed according to the principles of the present invention. The battery rack 400 includes a first battery compartment 410 for receiving a first battery 420 having first terminals 425 and a second battery compartment 430 for receiving a second battery 440 having second terminals 445. As shown in FIG. 4, ends 447 of the second terminals 445 face ends 427 of the first terminals 425. While the batteries 420, 440 shown in FIG. 4 are configured in a substantially horizontal orientation relative to the rack 400, the batteries 420, 430 may also be configured in other orientations, such as a substantially vertical orientation, wherein the terminal ends 425, 445 face one another. By orienting the terminal ends 425, 445 to face one another, the battery density may be increased over configurations of the prior art. Moreover, such an advantage may be obtained even with conventional battery racks or other enclosures typically housing batteries in a substantially vertical orientation with the terminal ends all facing the same direction (typically toward the top of the rack).

As shown in FIG. 4, the battery rack 400 may also include a third battery compartment 450 for receiving a third battery 460 having third terminals 465 and a fourth battery compartment 470 for receiving a fourth battery 480 having fourth terminals 485. The first, second, third and fourth batteries 420, 440, 460, 480 may be serially connected by conventional electrical coupling means 405 to form a battery string. However, those skilled in the art will understand that the present invention is not limited to battery strings comprising four batteries, such that the battery rack 400 may include strings of more or fewer batteries.

The battery rack 400 also includes partitions 490a, 490b and actuators 495a, 495b which, in one embodiment, may be at least similar to the partition 150 and actuator 160 shown in FIGS. 1 and 3. The partitions 490a, 490b may be translatable to selectively obstruct or allow access to terminal ends of one or more of the batteries 420, 440, 460, 480 (such as terminal ends 427, 447), as with the embodiments described in reference to FIGS. 1 and 3 above. For example, in the particular embodiment shown in FIG. 4, the partition 490a is in a first battery access position which may obstruct access to the first terminal ends 427 of the first battery 420 and allow access to the second terminal ends 447 of the second battery 440. Similarly, the partition 490b is shown as having been translated to a second battery access position, in which the partition 490b may obstruct access to the ends of the fourth terminals 485 of the fourth battery 480 and allow access to the ends of the third terminals 465 of the third battery 460. In one embodiment, the partitions 490a, 490b may translate as an integral unit, such that translation of one of the partitions 490a, 490b causes the translation of the other of the partitions 490a, 490b. In such embodiments, the partitions 490a, 490b may be coupled to each other or may be formed as a single element (not shown).

The actuators 495a, 495b may be translatable to selectively connect or disconnect the terminals of one or more of the batteries 420, 440, 460, 480 from an external load 498 and/or the other battery strings 499, as with the embodiments described in reference to FIGS. 1 and 3 above. For example, in the particular embodiment shown in FIG. 4, the actuator 495a may connect the first and/or second batteries 420, 440 to the external load 498 or other battery strings 499 in an online position (see FIG. 1). Similarly, the actuator 495b is shown as having been translated to an offline position (the direction of such translation depicted in FIG. 4 as into the page) to disconnect the first, second, third and/or fourth batteries 420, 440, 460, 480 from the external load 498 or other battery strings 499. In one embodiment, the actuators 495a, 495b may include a tool interface 496 for aiding translation. The tool interface 496 may comprise an opening or protrusion configured to receive or engage a wrench, probe or other conventional tool or human appendage (preferably one or more fingers).

Moreover, the actuators 495a, 495b may translate as an integral unit, such that translation of one of the actuators 495a, 495b causes the translation of the other of the actuators 495a, 495b in one or both directions. In such embodiments, the actuators 495a, 495b may be coupled to each other or may be formed as a single element (not shown). Accordingly, translation of one of the actuators 495a, 495b may simultaneously disconnect all of the first, second, third and fourth batteries 420, 440, 460, 480 independently from the external load 498 or other battery strings 499.

Figure 5:
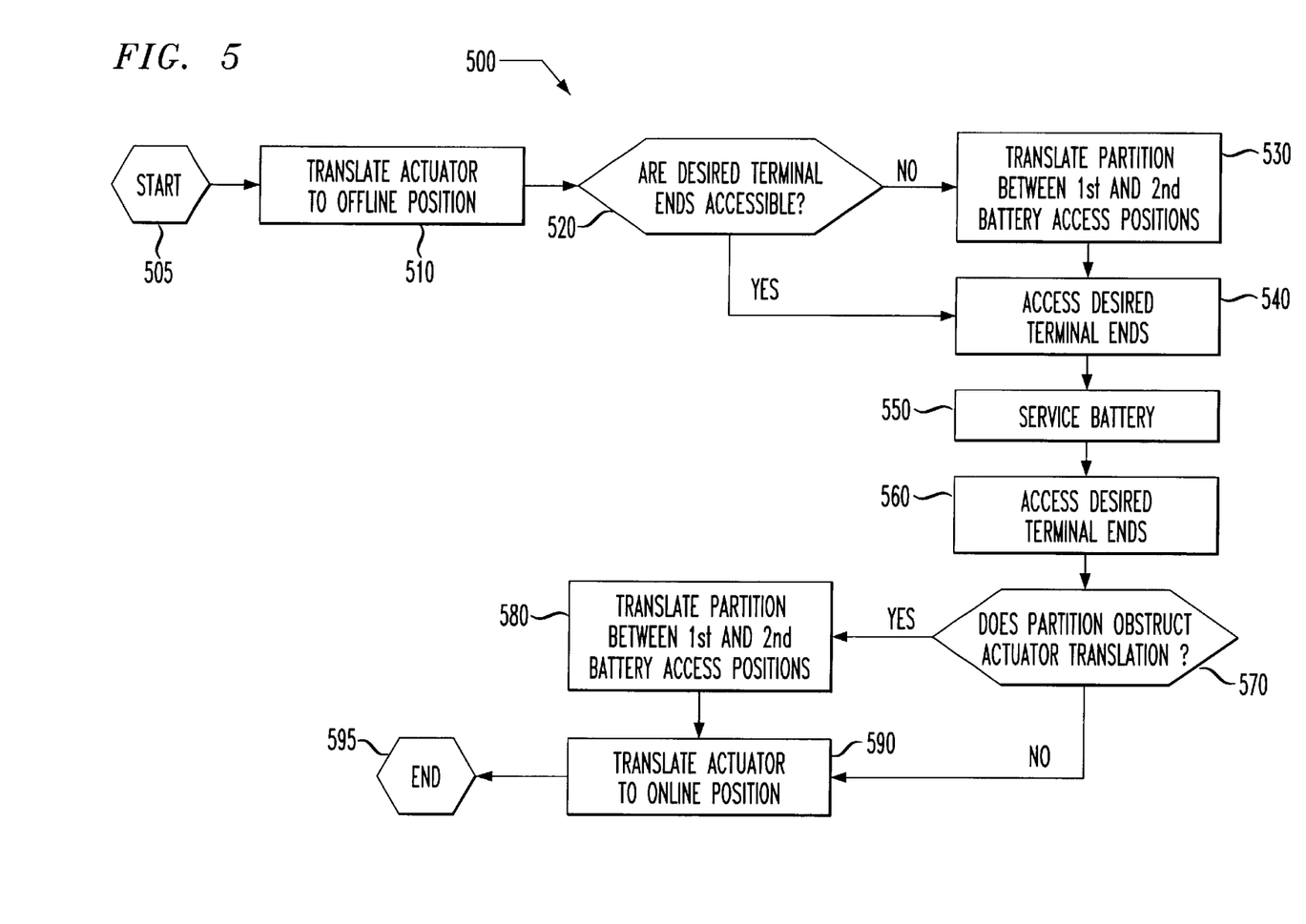
FIG. 5 illustrates a flow diagram of one embodiment of a method of servicing a battery in a battery rack according to the principles of the present invention.

Turning to FIG. 5, illustrated is a flow diagram of one embodiment of a method 500 of servicing a first battery having first terminals in a battery rack containing the first battery and a second battery having second terminals, according to the principles of the present invention. After the method 500 initiates at a start step 505, an actuator may be translated from an online position to an offline position, thereby disconnecting the first and/or second batteries from an external load and/or parallel battery string(s) at a step 510. For example, the translation of the actuator may engage a disconnect switch that disconnects the first and/or second batteries from the external load and/or other battery string (s). While the step 510 is not necessary in all embodiments of the present invention, the step 510 is advantageous in that it may require the battery being serviced to be disconnected from the external load and/or other battery string(s) before the terminals of the battery may be accessed.

A decisional step 520 then determines if the terminal ends of the battery to be accessed are accessible in view of the position of a partition interposing the first and second terminals. If access to the terminals of the battery being serviced is obstructed by the partition, the partition may be translated between first and second battery access positions in a step 530. In one embodiment, the online position of the actuator may obstruct such translation of the partition, and the offline position of the actuator may allow such translation of the partition, such that the translation of the actuator in the step 510 may be required before the translation of the partition. In this manner, access to the battery being serviced may be prevented when the battery is connected to the external load or other battery string(s). Moreover, access to terminal ends of batteries adjacent the battery being serviced may be obstructed by the interposition of the partition therebetween. Thus, conventional batteries may be installed into conventional battery enclosures with higher battery-packing densities, yet the high energy bridging or shorting hazard resulting from the restricted access volume may be substantially decreased or even eliminated.

In a step 540, the desired terminal ends may be accessed, such as to disconnect leads from the terminals, and the appropriate battery may be serviced in a step 550. The interposition of the partition between the first and second terminals may thus minimize the risk of high energy bridging or shorting across the terminals by obstructing access to the terminal ends of the batteries not being serviced. For example, a wrench or other tool used to access the terminal ends of a battery being serviced may be prevented by the partition from contacting the terminal ends of adjacent batteries.

Once the battery is serviced, its terminal ends are again accessed in a step 560, such as to reconnect leads to the terminals. A decisional step 570 then determines if the partition obstructs translation of the actuator. Thus, if necessary, the partition may be translated between the first and second battery access positions in a step 580. In other embodiments, translation of the actuator may not be obstructed by the partition in either the first or the second battery access position, such that the actuator may be translated between the offline and online positions regardless of the battery access position of the partition.

In a step 590, the actuator may be translated to an online position to reconnect the first and/or second batteries to the external load or other battery string(s). The method 500 then ends at a termination step 595.

Although the present invention has been described in detail, those skilled in the art should understand that they can make various changes, substitutions and alterations herein without departing from the spirit and scope of the invention in its broadest form.

What is claimed is:

1. For use with a rack for supporting a first battery having first terminals and a second battery having second terminals, an interlock kit, comprising:
   a partition mount couplable to said rack proximate said first battery and said second battery; and
   a partition coupled to said partition mount and translatable between a first battery access position that allows access to ends of said first terminals and obstructs access to said second terminals and a second battery access position that allows access to ends of said second terminals and obstructs access to said first terminals.

2. The kit recited in claim 1 further comprising:
   an actuator mount couplable to said rack proximate said first battery and said second battery; and
   an actuator coupled to said actuator mount and translatable between an online position that obstructs translation of said partition and in which said first and second batteries are connected to an external load and an offline position that allows translation of said partition and in which said first and second batteries are disconnected from said external load.

3. The kit recited in claim 2 wherein said actuator obstructs access to one of said first and second terminal ends when in said online position.

4. The kit as recited in claim 1 wherein said first terminal ends face said second terminal ends and said partition interposes said first and second terminals.

5. The kit as recited in claim 1 wherein said rack supports a third battery having third terminals and a fourth battery having fourth terminals and said first battery access position allows access to ends of said third terminals and obstructs access to said fourth terminals and said second battery access position allows access to ends of said fourth terminals and obstructs access to said third terminals.

6. The kit as recited in claim 2 wherein said rack supports a third battery having third terminals and a fourth battery having fourth terminals, said online position causing said third and fourth batteries to be connected to said external load and said offline position causing said third and fourth batteries to be disconnected from said external load.

7. The kit as recited in claim 2 wherein said actuator engages a disconnect switch to connect and disconnect said first and second batteries to and from said external load.

8. A battery rack, comprising:
   a first battery compartment, located within said rack, for receiving a first battery having first terminals; and
   a second battery compartment, located within said rack, for receiving a second battery having second terminals, wherein ends of said second terminals face ends of said first terminals.

9. The battery rack as recited in claim 8 further comprising:
   a partition mount coupled to said rack proximate said first battery and said second battery; and
   a partition coupled to said partition mount and translatable between a first battery access position that allows access to said first terminal ends and obstructs access to said second terminals and a second battery access position that allows access to said second terminal ends and obstructs access to said first terminals.

10. The battery rack as recited in claim 9 further comprising:
    an actuator mount coupled to said rack proximate said first battery and said second battery; and
    an actuator coupled to said actuator mount and translatable between an online position that obstructs translation of said partition and in which said first and second batteries are connected to an external load and an offline position that allows translation of said partition and in which said first and second batteries are disconnected from said external load.

11. The battery rack as recited in claim 10 wherein said actuator obstructs access to one of said first and second terminal ends when in said online position.

12. The battery rack as recited in claim 9 wherein said first terminal ends face said second terminal ends and said partition interposes said first and second terminals.

13. The battery rack as recited in claim 9 further comprising:
    a third battery compartment, located within said rack, for receiving a third battery having third terminals; and
    a fourth battery compartment, located with said rack, for receiving a fourth battery having fourth terminals, wherein said first battery access position allows access to said third terminal ends and obstructs access to said fourth terminals and said second battery access position allows access to said fourth terminal ends and obstructs access to said third terminals.

14. The battery rack as recited in claim 13 wherein said online position causes said third and fourth batteries to be connected to said external load and said offline position causes said third and fourth batteries to be disconnected from said external load.

15. The battery rack as recited in claim 9 wherein said actuator engages a disconnect switch to connect and disconnect said first and second batteries to and from said load.

16. A method of servicing a first battery having first terminals in a battery rack containing said first battery and a second battery having second terminals, comprising:
    translating a partition to a first battery access position that allows access to ends of said first terminals and obstructs access to said second terminals; and
    accessing said first terminal ends.

17. The method as recited in claim 16 further comprising translating an actuator from an online position to an offline position, said online position obstructing said translation of said partition and in which said first and second batteries are connected to an external load, said offline position allowing said translation of said partition and in which said first and second batteries are disconnected from said external load.

18. The method as recited in claim 17 wherein said translating said actuator includes engaging a disconnect switch to disconnect said first and second batteries from said load.

19. The method as recited in claim 17 further comprising translating said actuator to said online position.

20. The method as recited in claim 16 further comprising translating said partition to a second battery access position that allows access to ends of said second terminals and obstructs access to said first terminals.

* * * * *